(12) United States Patent
Zhao et al.

(10) Patent No.: US 10,423,602 B2
(45) Date of Patent: Sep. 24, 2019

(54) DATA UPDATE METHOD, APPARATUS, AND EMBEDDED UNIVERSAL INTEGRATED CIRCUIT CARD

(71) Applicant: Huawei Technologies Co., Ltd., Shenzhen (CN)

(72) Inventors: Xiaona Zhao, Beijing (CN); Xinmiao Chang, Beijing (CN); Guoqing Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 15/541,266

(22) PCT Filed: Jan. 4, 2015

(86) PCT No.: PCT/CN2015/070060
§ 371 (c)(1),
(2) Date: Jun. 30, 2017

(87) PCT Pub. No.: WO2016/106778
PCT Pub. Date: Jul. 7, 2016

(65) Prior Publication Data
US 2018/0004736 A1   Jan. 4, 2018

(51) Int. Cl.
*H04W 8/18* (2009.01)
*G06F 16/23* (2019.01)
(Continued)

(52) U.S. Cl.
CPC ............ *G06F 16/23* (2019.01); *H04B 1/38* (2013.01); *H04L 67/1014* (2013.01); *H04L 67/30* (2013.01); *H04W 8/18* (2013.01)

(58) Field of Classification Search
None
See application file for complete search history.

(56) References Cited

U.S. PATENT DOCUMENTS

2008/0256020 A1* 10/2008 Wakefield ......... H04L 29/12169
2013/0023309 A1   1/2013 Holtmanns et al.
(Continued)

FOREIGN PATENT DOCUMENTS

CA    2805625 A1   9/2013
CN    102325210 A  1/2012
(Continued)

OTHER PUBLICATIONS

"Embedded SIM Remote Provisioning Architecture Version 1.1," GSMA Association, Official Document SGP.01—Embedded SIM Remote Provisioning Architecture,(Jan. 30, 2014).

*Primary Examiner* — Wilson Lee
(74) *Attorney, Agent, or Firm* — Leydig, Voit & Mayer, Ltd.

(57) ABSTRACT

The present invention provides a data update method, an apparatus, and an eUICC. The method is applied to an eUICC in which a management apparatus and at least one SE are disposed, where the at least one SE is configured to store an application corresponding to at least one profile. The management apparatus receives a profile enabling request, where the enabling request is used to switch a source profile to a target profile, the enabling request includes identifier information of the target profile, and the source profile is a profile that is in an enabled state before the switching; and updates a first correspondence to a second correspondence according to the enabling request; and the second correspondence is a correspondence between a second application set and the target profile, and the second application set includes at least one application in the first application set.

20 Claims, 4 Drawing Sheets

(51) Int. Cl.
*H04B 1/38* (2015.01)
*H04L 29/08* (2006.01)

(56) References Cited

U.S. PATENT DOCUMENTS

| | | |
|---|---|---|
| 2013/0085856 A1* | 4/2013 | Vlad ...................... G06Q 30/02 |
| | | 705/14.55 |
| 2013/0231087 A1* | 9/2013 | O'Leary ................. H04W 8/22 |
| | | 455/411 |
| 2014/0087790 A1 | 3/2014 | Babbage et al. |
| 2014/0228071 A1 | 8/2014 | Villarrubia Grande et al. |
| 2014/0308991 A1* | 10/2014 | Lee ....................... H04W 8/183 |
| | | 455/558 |
| 2015/0105080 A1 | 4/2015 | Jin |
| 2015/0110035 A1 | 4/2015 | Lee et al. |

FOREIGN PATENT DOCUMENTS

| | | |
|---|---|---|
| CN | 103312680 A | 9/2013 |
| CN | 103493526 A | 1/2014 |
| CN | 103634791 A | 3/2014 |
| CN | 103765934 A | 4/2014 |
| CN | 103797828 A | 5/2014 |
| EP | 2773077 A1 | 9/2014 |
| KR | 20130049730 A | 5/2013 |
| WO | 2013176499 A2 | 11/2013 |

* cited by examiner

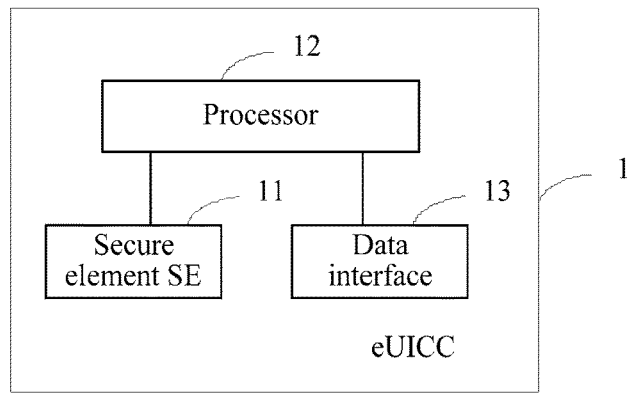

FIG. 1

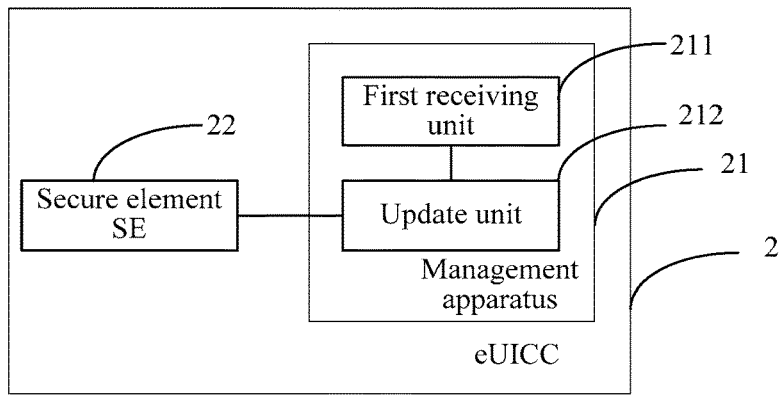

FIG. 2

A management apparatus receives a profile enabling request, where the profile enabling request is used to switch a source profile to a target profile, the profile enabling request includes identifier information of the target profile, and the source profile is a profile that is in an enabled state before the switching — 301

The management apparatus updates a first correspondence to a second correspondence according to the profile enabling request, where the first correspondence is a correspondence between a first application set and the source profile, and the first application set includes at least one application in at least one SE; and the second correspondence is a correspondence between a second application set and the target profile, and the second application set includes at least one application in the first application set — 302

FIG. 3

DATA UPDATE METHOD, APPARATUS, AND EMBEDDED UNIVERSAL INTEGRATED CIRCUIT CARD

CROSS-REFERENCE TO RELATED APPLICATIONS

This application is a national stage of International Application No. PCT/CN2015/070060, filed on Jan. 4, 2015, which is hereby incorporated by reference in its entirety.

TECHNICAL FIELD

The present invention relates to the field of communication security technologies, and in particular, to a data update method, an apparatus, and an embedded universal integrated circuit card (embedded Universal Integrated Circuit Card, eUICC).

BACKGROUND

With popularity of mobile terminals, mobile payment services have gradually developed. To improve security of the mobile payment services, usually a secure element (Secure Element, SE) needs to be disposed in a terminal, to implement secure storage and computation of sensitive data of a user. The SE may be controlled by a mobile network operator (Mobile Network Operator, MNO), and a physical carrier of the SE may be a UICC (Universal Integrated Circuit Card, universal integrated circuit card), or may be an unpluggable eUICC directly welded in the terminal. According to an eUICC remote provisioning protocol formulated by the GSMA, multiple profiles (Profile) of multiple MNOs may be configured in each eUICC. Each profile is downloaded and installed in a main security domain dedicated to an MNO corresponding to the profile (that is, an ISD-P (Issuer Security Domain) defined in the eUICC remote provisioning protocol by the GSMA). The terminal enables a profile of one MNO each time, and when MNO switching needs to be performed, the terminal needs to disable a profile of an original MNO (referred to as a source profile below), and enable a profile of a new MNO (referred to as a target profile below). The profile is a collection of MNO-related file structures, data, and applications, including a profile type, an ISD-P AID, an ICCID, an MSISDN, a DPID, and the like, and may be configured in the ISD-P over the air.

Currently, a UICC SE is a secure element implementation solution dominated and controlled by an MNO. Each application service provider needs to first sign a business cooperation agreement with an operator in order to download an application and install the application in the UICC SE. In addition, different MNOs of a same country or different MNOs of different countries may also sign a cooperation agreement to implement use of a same application in different MNO environments, so as to bring convenience to users and promote development of the industry. For example, operators from China, Japan, and Korea (which are separately China Mobile, NTT DOCOMO, and KT) reached an agreement on NFC international roaming in 2013. However, when a physical carrier of an SE in which MNO-related payment applications are located is changed from a UICC to an eUICC, some or all applications corresponding to a source profile cannot be normally used in an MNO environment corresponding to a target profile after profile switching is performed, because none of operations such as SE creation, deletion, and management, and application downloading, installation, and update is specified in the current eUICC remote provisioning protocol formulated by the GSMA.

SUMMARY

Embodiments of the present invention provide a data update method, an apparatus, and an eUICC, to resolve a prior-art problem that switching of an MNO in an eUICC easily leads to that an application in an SE cannot be used, affecting access of a user to application data in the SE.

To resolve the foregoing technical problem, the embodiments of the present invention disclose the following technical solutions:

According to a first aspect, a data update method is provided, where the method is applied to a universal integrated circuit card eUICC in which a management apparatus and at least one secure element SE are disposed, where the at least one SE is configured to store an application corresponding to at least one profile profile, and the management apparatus is configured to manage the at least one SE; and the method includes:

receiving, by the management apparatus, a profile enabling request, where the profile enabling request is used to switch a source profile to a target profile, the profile enabling request includes identifier information of the target profile, and the source profile is a profile that is in an enabled state before the switching; and updating, by the management apparatus, a first correspondence to a second correspondence according to the profile enabling request, where the first correspondence is a correspondence between a first application set and the source profile, and the first application set includes at least one application in the at least one SE; and the second correspondence is a correspondence between a second application set and the target profile, and the second application set includes at least one application in the first application set.

In a first possible implementation manner of the first aspect, the first application set includes: an application that is in the at least one SE and that corresponds to both the source profile and the target profile.

With reference to the first aspect or the first possible implementation manner of the first aspect, in a second possible implementation manner, the at least one secure element SE is at least one public SE; and the at least one public SE is configured to store at least an application corresponding to the source profile and an application corresponding to the target profile.

With reference to the first aspect or the first or the second possible implementation manner of the first aspect, in a third possible implementation manner, before the updating, by the management apparatus, a first correspondence to a second correspondence according to the profile enabling request, the method further includes:

storing, by the management apparatus, the first correspondence, where the first correspondence includes a correspondence between an identifier of the first application set and identification information of the source profile.

With reference to the first aspect or the first or the second or the third possible implementation manner of the first aspect, in a fourth possible implementation manner, the updating, by the management apparatus, a first correspondence to a second correspondence according to the profile enabling request specifically includes:

selecting, by the management apparatus, at least one application from the first application set according to the identification information of the target profile or according to the identification information of the target profile and a user indication; and obtaining, by the management apparatus, an identifier of the selected at least one application from the first correspondence, and associating the identifier of the at least one application with the identification information of the target profile, to obtain the second correspondence.

With reference to the first aspect or the first or the second or the third or the fourth possible implementation manner of the first aspect, in a fifth possible implementation manner, the storing, by the management apparatus, the first correspondence includes:

storing, by the management apparatus, a first mapping table of the eUICC and at least one profile, where the first mapping table includes at least the identification information of the source profile;

storing, by the management apparatus, a second mapping table of the eUICC, the at least one public SE, and the at least one application in the at least one public SE; and associating, by the management apparatus, the first mapping table with the second mapping table, to obtain the first correspondence.

With reference to the first aspect or the first or the second or the third or the fourth or the fifth possible implementation manner of the first aspect, in a sixth possible implementation manner, the first mapping table further includes: an identifier of the eUICC; or an identifier of the eUICC, enabled state information corresponding to the source profile, the identification information of the target profile, and disabled state information corresponding to the target profile;

the second mapping table further includes: the identifier of the eUICC, an identifier of the at least one public SE, and an identifier of the at least one application; or the identifier of the eUICC, an identifier of the at least one public SE, an identifier of the at least one application, and enabled or disabled state information of the at least one application; and the obtaining, by the management apparatus, an identifier of the selected at least one application from the first correspondence, and associating the identifier of the at least one application with the identification information of the corresponding target profile, to obtain the second correspondence includes:

updating, by the management apparatus, the identification information of the source profile in the first mapping table to the identification information of the target profile; or updating, by the management apparatus, the enabled state information corresponding to the source profile in the first mapping table to disabled state information, and updating the disabled state information corresponding to the target profile to enabled state information;

updating, by the management apparatus, the identifier of the at least one application in the second mapping table to an identifier of at least one of the at least one application; or setting, by the management apparatus, status information of the at least one application in the second mapping table to an enabled state, and setting status information corresponding to a remaining application to a disabled state; and associating, by the management apparatus, the first mapping table with the second mapping table, to obtain the second correspondence.

With reference to the first aspect or the first or the second or the third or the fourth or the fifth or the sixth possible implementation manner of the first aspect, in a seventh possible implementation manner, the at least one application in the first application set includes: at least one application that is determined by the management apparatus from the first application set according to a setting preset by a user; or at least one application that is determined by the management apparatus from the first application set according to a selection made by a user during profile switching or after profile switching.

With reference to the first aspect or the first or the second or the third or the fourth or the fifth or the sixth or the seventh possible implementation manner of the first aspect, in an eighth possible implementation manner, the method further includes:

when the at least one application in the first application set is at least one application that is determined by the management apparatus from the first application set according to a selection made by a user during profile switching or after profile switching, the method further includes:

outputting, by the management apparatus, an application list to a terminal, where the application list includes the first application set stored in the public SE or at least one application in the first application set; and determining, by the management apparatus, at least one application from the application list according to a selection made by the user.

With reference to the first aspect, in a ninth possible implementation manner, the at least one secure element SE includes a first private SE and a second private SE, the first private SE is disposed in a corresponding first storage module, and the second private SE is disposed in a corresponding second storage module;

the source profile is installed in the first storage module, and the target profile is installed in the second storage module;

the first private SE stores at least one application corresponding to the source profile, and the second private SE stores at least one application corresponding to the target profile; and the first storage module and the second storage module are disposed in the eUICC, and are managed by the management apparatus.

With reference to the first aspect or the ninth possible implementation manner of the first aspect, in a tenth possible implementation manner, the first application set is specifically the at least one application corresponding to the source profile in the first private SE; and the updating, by the management apparatus, a first correspondence to a second correspondence according to the profile enabling request specifically includes:

determining, by the management apparatus, information indicating that application and data migration needs to be performed, where the information is information used to migrate an application and data from the first private SE to the second SE; and migrating, by the management apparatus, at least one application in the first application set and data related to the at least one application to the second private SE according to the information, so as to update the first correspondence to the second correspondence.

With reference to the first aspect or the ninth or the tenth possible implementation manner of the first aspect, in an eleventh possible implementation manner, the migrating, by the management apparatus, at least one application in the first application set and data related to the application to the second private SE according to the information includes:

obtaining, by the management apparatus, the at least one application and the data related to the at least one application from the first application set according to the information; and migrating, by the management apparatus, the obtained at least one application and the obtained data related to the at least one application to the second private SE.

With reference to the first aspect or the ninth or the tenth or the eleventh possible implementation manner of the first aspect, in a twelfth possible implementation manner, the at least one application in the first application set and the data related to the at least one application include:

at least one application that is determined by the management apparatus from the first application set according to a setting preset by a user, and data related to the application; or at least one application that is determined by the management apparatus from the first application set according to a selection made by a user during profile switching or after profile switching, and data related to the at least one application.

With reference to the first aspect or the ninth or the tenth or the eleventh or the twelfth possible implementation manner of the first aspect, in a thirteenth possible implementation manner, when the at least one application determined from the first application set is at least one application that is determined by the management apparatus from the first application set according to a selection made by a user during profile switching or after profile switching, the method further includes:

outputting, by the management apparatus, a migratable-application list to a terminal, where the migratable-application list includes an identifier of an application that is stored in the first private SE and that can be used when switching to the target profile is performed; and determining, by the management apparatus, at least one application from the first application set according to a selection made by the user in the migratable-application list.

According to a second aspect, a data update management apparatus is provided, where the management apparatus is disposed in a universal integrated circuit card eUICC, at least one secure element SE is further disposed in the eUICC, the at least one SE is configured to store an application corresponding to at least one profile profile, and the management apparatus is configured to manage the at least one SE; and the management apparatus includes:

a first receiving unit, configured to receive a profile enabling request, where the profile enabling request is used to switch a source profile to a target profile, the profile enabling request includes identifier information of the target profile, and the source profile is a profile that is in an enabled state before the switching; and an update unit, configured to update a first correspondence to a second correspondence according to the profile enabling request, where the first correspondence includes a correspondence between a first application set and the source profile, and the first application set includes at least one application in the at least one SE; and the second correspondence is a correspondence between a second application set and the target profile, and the second application set includes at least one application in the first application set.

In a first possible implementation manner of the second aspect, the at least one application updated by the update unit includes: an application that is in the at least one SE and that corresponds to both the source profile and the target profile.

With reference to the second aspect or the first possible implementation manner of the second aspect, in a second possible implementation manner, the update unit is specifically configured to: when the at least one secure element SE is at least one public SE, and the at least one public SE is configured to store at least an application corresponding to the source profile and an application corresponding to the target profile, update the first correspondence to the second correspondence according to the profile enabling request.

With reference to the second aspect or the first or the second possible implementation manner of the second aspect, in a third possible implementation manner, the apparatus further includes:

a storage unit, configured to: before the update unit updates the first correspondence to the second correspondence according to the profile enabling request, store the first correspondence, where the first correspondence includes a correspondence between an identifier of the first application set and identification information of the source profile.

With reference to the second aspect or the first or the second or the third possible implementation manner of the second aspect, in a fourth possible implementation manner, the update unit includes:

a selection unit, configured to select at least one application from the first application set according to the identification information of the target profile or according to the identification information of the target profile and a user indication; and a first update unit, configured to obtain an identifier of the selected at least one application from the first correspondence, and associate the identifier of the at least one application with the identification information of the target profile, to obtain the second correspondence.

With reference to the second aspect or the first or the second or the third or the fourth possible implementation manner of the second aspect, in a fifth possible implementation manner, the storage unit includes:

a first storage unit, configured to store a first mapping table of the eUICC and at least one profile, where the first mapping table includes at least the identification information of the source profile;

a second storage unit, configured to store a second mapping table of the eUICC, the at least one public SE, and the at least one application in the at least one public SE; and an association unit, configured to associate the first mapping table with the second mapping table, to obtain the first correspondence.

With reference to the second aspect or the first or the second or the third or the fourth or the fifth possible implementation manner of the second aspect, in a sixth possible implementation manner, the first mapping table stored in the first storage unit further includes: an identifier of the eUICC; or an identifier of the eUICC, enabled state information corresponding to the source profile, the identification information of the target profile, and disabled state information corresponding to the target profile;

the second mapping table stored in the second storage unit further includes: the identifier of the eUICC, an identifier of the at least one public SE, and an identifier of the at least one application; or the identifier of the eUICC, an identifier of the at least one public SE, an identifier of the at least one application, and enabled or disabled state information of the at least one application; and the first update unit is specifically configured to: update the first mapping table according to the profile enabling request, where the identification information of the source profile in the first mapping table is updated to the identification information of the target profile; or the enabled state information corresponding to the source profile in the first mapping table is updated to disabled state information, and the disabled state information corresponding to the target profile is updated to enabled state information; update the second mapping table according to the profile enabling request, where the identifier of the at least one application in the second mapping table is updated to an identifier of at least one of the at least one application; or status information corresponding to at least one of the at least one application in the second mapping table is set to an enabled state, and status information corresponding to a remaining application is set to a disabled state; and associate the first mapping table with the second mapping table, to obtain the second correspondence.

With reference to the second aspect or the first or the second or the third or the fourth or the fifth or the sixth possible implementation manner of the second aspect, in a seventh possible implementation manner,
the at least one application that is updated by the update unit and that is in the first application set includes: at least one application that is determined from the first application set according to a setting preset by a user; or at least one application that is determined from the first application set according to a selection made by a user during profile switching or after profile switching.

With reference to the second aspect or the first or the second or the third or the fourth or the fifth or the sixth or the seventh possible implementation manner of the second aspect, in an eighth possible implementation manner, the apparatus further includes:
a first output unit, configured to: when the at least one application that is updated by the update unit that is in the first application set is at least one application that is determined by the management apparatus from the first application set according to a selection made by a user during profile switching or after profile switching, output an application list to a terminal, where the application list includes the first application set stored in the public SE or at least one application in the first application set; and
a first determining unit, configured to determine at least one application from the application list according to a selection made by the user.

In a ninth possible implementation manner of the second aspect, the at least one secure element SE includes a first private SE and a second private SE, and at least a first storage module and a second storage module are further disposed in the eUICC; the management apparatus is further configured to manage at least the first storage module and the second storage module, the source profile is installed in the first storage module, and the target profile is installed in the second storage module; and the first private SE is disposed in the first storage module, and the second private SE is disposed in the second storage module, where the first private SE is configured to store at least one application corresponding to the source profile, and the second private SE is configured to store at least one application corresponding to the target profile.

With reference to the second aspect or the ninth possible implementation manner of the second aspect, in a tenth possible implementation manner, the first application set is specifically the at least one application corresponding to the source profile in the first private SE; and the update unit includes:
a second determining unit, configured to determine information indicating that application and data migration needs to be performed, where the information is information used to migrate an application and data from the first private SE to the second private SE; and
a migration unit, configured to migrate, according to the information, at least one application in the first application set and data related to the at least one application to the second private SE corresponding to the target profile, so that the first correspondence is updated to the second correspondence.

With reference to the second aspect or the ninth or the tenth possible implementation manner of the second aspect, in an eleventh possible implementation manner, the migration unit includes:
an obtaining unit, configured to obtain the at least one application and the data related to the at least one application from the first application set according to the information; and
a first migration unit, configured to migrate the obtained at least one application and the obtained data related to the at least one application to the second private SE.

With reference to the second aspect or the ninth or the tenth or the eleventh possible implementation manner of the second aspect, in a twelfth possible implementation manner, the at least one application in the first application set and the data related to the at least one application that are obtained by the obtaining unit include:
at least one application that is determined from the first application set according to a setting preset by a user, and data related to the at least one application; or at least one application that is determined from the first application set according to a selection made by a user during profile switching or after profile switching, and data related to the at least one application.

With reference to the second aspect or the ninth or the tenth or the eleventh or the twelfth possible implementation manner of the second aspect, in a thirteenth possible implementation manner, the apparatus further includes:
a second output unit, configured to: when the at least one application that is determined from the first application set and that is obtained by the obtaining unit is at least one application that is determined by the management apparatus from the first application set according to a selection made by a user during profile switching or after profile switching, output a migratable-application list to a terminal, where the migratable-application list includes an identifier of an application that is stored in the first private SE and that can be used when switching to the target profile is performed; and
a third determining unit, configured to determine at least one application from the first application set according to a selection made by the user in the migratable-application list.

According to a third aspect, a universal integrated circuit card eUICC is provided, including:
at least one secure element SE, where each SE is configured to store an application corresponding to at least one profile profile;
a processor, configured to manage at least one application stored in the at least one SE; and
a data interface, configured to receive a profile enabling request, where the profile enabling request is used to switch a source profile to a target profile, the profile enabling request includes identifier information of the target profile, and the source profile is a profile that is in an enabled state before the switching, where
the processor is further configured to update a first correspondence to a second correspondence according to the profile enabling request, where the first correspondence includes a correspondence between a first application set and the source profile, and the first application set includes at least one application in the at least one SE; and the second correspondence is a correspondence between the second application set and the target profile, and the second application set includes at least one application in the first application set.

In a first possible implementation manner of the third aspect, the first application set managed by the processor includes: an application that is in the at least one SE and that corresponds to both the source profile and the target profile.

With reference to the third aspect or the first possible implementation manner of the third aspect, in a second possible implementation manner, the at least one SE is at least one public SE, and the at least one public SE is configured to store at least an application corresponding to the source profile and an application corresponding to the target profile.

With reference to the third aspect or the first or the second possible implementation manner of the third aspect, in a third possible implementation manner, the eUICC further includes: a memory, configured store the first correspondence, where the first correspondence includes a correspondence between an identifier of the first application set and identification information of the source profile.

With reference to the third aspect or the first or the second or the third possible implementation manner of the third aspect, in a fourth possible implementation manner, the updating a first correspondence to a second correspondence according to the profile enabling request specifically includes:

selecting at least one application from the first application set according to the identification information of the target profile or according to the identification information of the target profile and a user indication; and obtaining an identifier of the selected at least one application from the first correspondence, and associating the identifier of the at least one application with the identification information of the target profile, to obtain the second correspondence.

With reference to the third aspect or the first or the second or the third or the fourth possible implementation manner of the third aspect, in a fifth possible implementation manner, the first correspondence specifically includes: a first mapping table of the eUICC and at least one profile, where the first mapping table includes at least the identification information of the source profile; and a second mapping table of the eUICC, the at least one public SE, and the at least one application in the at least one public SE; and the first mapping table is associated with the second mapping table, to obtain the first correspondence.

With reference to the third aspect or the first or the second or the third or the fourth or the fifth possible implementation manner of the third aspect, in a sixth possible implementation manner, the first mapping table further includes: an identifier of the eUICC; or an identifier of the eUICC, enabled state information corresponding to the source profile, the identification information of the target profile, and disabled state information corresponding to the target profile;

the second mapping table further includes: the identifier of the eUICC, an identifier of the at least one public SE, and an identifier of the at least one application; or the identifier of the eUICC, an identifier of the at least one public SE, an identifier of the at least one application, and enabled or disabled state information of the at least one application; and the obtaining an identifier of the selected at least one application from the first correspondence, and associating the identifier of the at least one application with the identification information of the target profile, to obtain the second correspondence specifically includes:

updating the identification information of the source profile in the first mapping table to the identification information of the target profile; or updating the enabled state information corresponding to the source profile in the first mapping table to disabled state information, and updating the disabled state information corresponding to the target profile to enabled state information;

updating the identifier of the at least one application in the second mapping table to an identifier of at least one of the at least one application; or setting status information of the at least one application in the second mapping table to an enabled state, and setting status information corresponding to a remaining application to a disabled state; and associating the first mapping table with the second mapping table, to obtain the second correspondence.

With reference to the third aspect or the first or the second or the third or the fourth or the fifth or the sixth possible implementation manner of the third aspect, in a seventh possible implementation manner, the at least one application in the first application set includes:

at least one application that is determined from the first application set according to a setting preset by a user; or at least one application that is determined from the first application set according to a selection made by a user during profile switching or after profile switching.

With reference to the third aspect or the first or the second or the third or the fourth or the fifth or the sixth or the seventh possible implementation manner of the third aspect, in an eighth possible implementation manner, the data interface is further configured to: when the at least one application in the first application set is at least one application that is determined by the processor from the first application set according to a selection made by a user during profile switching or after profile switching, output an application list to a terminal, where the application list includes the first application set stored in the public SE or at least one application in the first application set; and the processor is further configured to determine at least one application from the application list according to a selection made by the user.

With reference to a ninth possible implementation manner of the third aspect, the at least one SE includes a first private SE and a second private SE, the first private SE is disposed in a first private storage device, and the second private SE is disposed in a second private storage device;

the processor is configured to manage the first private SE and the second private SE;

the source profile is installed in the first private SE, and the target profile is installed in the second private SE;

the first private SE is configured to store at least one application that corresponds to a profile installed in the first private storage device; and the second private SE is configured to store at least one application that corresponds to a profile installed in the second private storage device.

With reference to the third aspect or the ninth possible implementation manner of the third aspect, in a tenth possible implementation manner, the processor is further configured to: determine information indicating that application and data migration needs to be performed, where the information is information used to migrate an application and data from the first private SE to the second private SE; and migrate at least one application in the first application set and data related to the at least one application to the second private SE according to the information, so as to update the first correspondence to the second correspondence.

With reference to the third aspect or the ninth or the tenth possible implementation manner of the third aspect, in an eleventh possible implementation manner, the migrating at least one application in the first application set and data related to the at least one application to the second private SE according to the information specifically includes:

obtaining the at least one application and the data related to the at least one application from the first application set according to the information; and migrating the obtained at least one application and the obtained data related to the at least one application to the second private SE.

With reference to the third aspect or the ninth or the tenth or the eleventh possible implementation manner of the third aspect, in a twelfth possible implementation manner, the obtaining the at least one application and the data related to the at least one application from the first application set includes:

the at least one application that is determined from the first application set according to the setting preset by the user, and data related to the at least one application; or the at least one application that is determined from the first application set according to the selection made by the user during the profile switching or after the profile switching, and data related to the at least one application.

With reference to the third aspect or the ninth or the tenth or the eleventh or the twelfth possible implementation manner of the third aspect, in a thirteenth possible implementation manner, the data interface is further configured to: when the at least one application determined from the first application set is at least one application that is determined by the processor from the first application set according to a selection made by a user during profile switching or after profile switching, output a migratable-application list to a terminal, where the migratable-application list includes an identifier of an application that is stored in the first private memory corresponding to the source profile and that can be used when switching to the target profile is performed; and the processor is further configured to determine, from the first application set according to a selection made by the user in the migratable-application list, at least one application in an application corresponding to the source profile.

It can be seen from the foregoing embodiments that in the embodiments of the present invention, a management apparatus can update a correspondence between at least one application (that is, a first application set) stored in at least one SE and a source profile to a correspondence between at least one application (that is, a second application set) in the first application set and a target profile according to a profile enabling request, so as to ensure that some or all applications in the SE can still be used when subscription information of a bound MNO becomes invalid, thereby ensuring that after enabling the target profile, a user can normally access and use some or all applications and data in the SE that correspond to the source profile.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic architectural diagram of an eUICC according to an embodiment of the present invention;

FIG. 2 is a schematic structural diagram of a data update apparatus according to an embodiment of the present invention;

FIG. 3 is a flowchart of a data update method according to an embodiment of the present invention;

DESCRIPTION OF EMBODIMENTS

Figure 4:
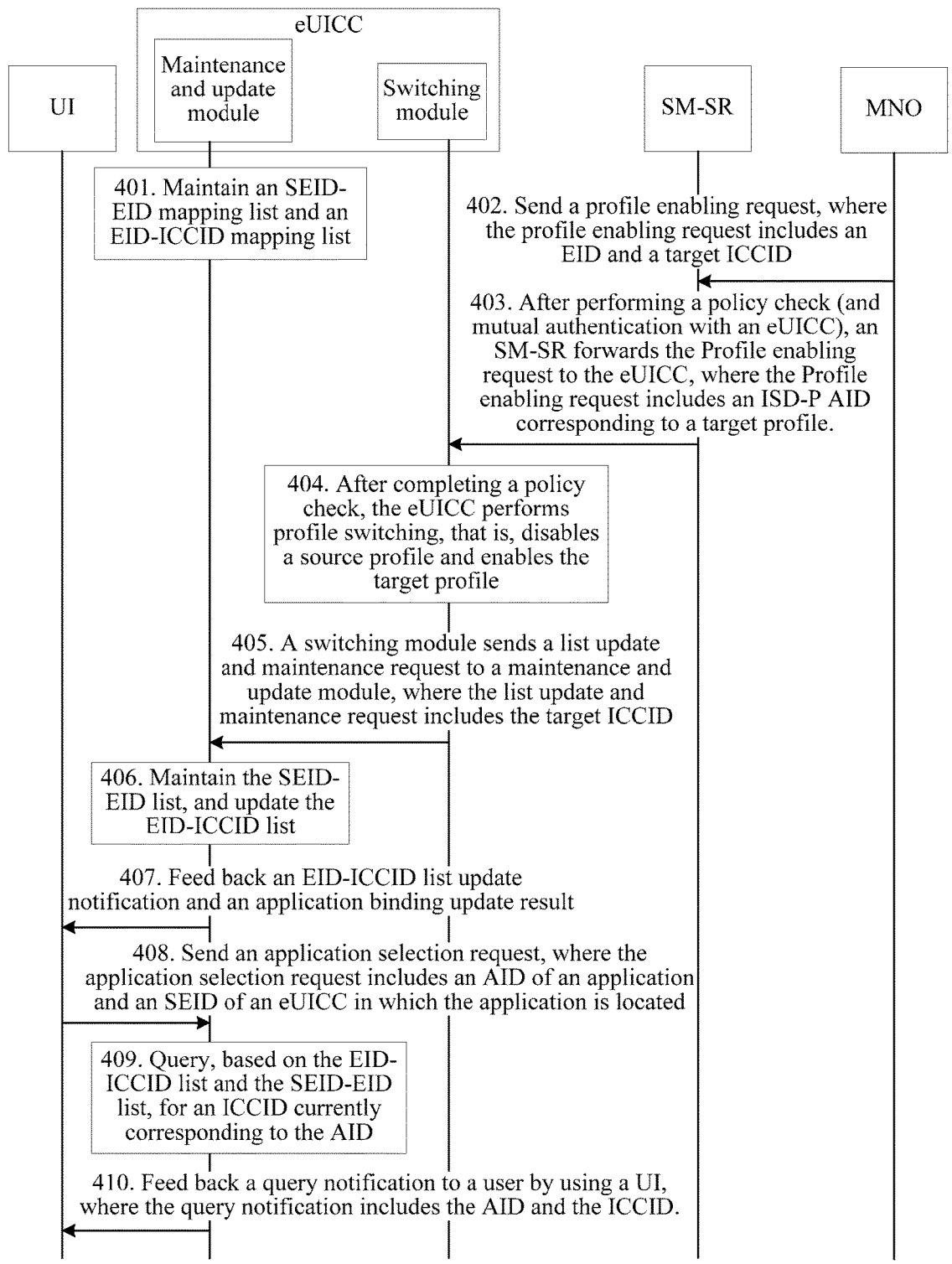
FIG. 4 is a flowchart of a first application example of a data update method according to an embodiment of the present invention.

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

Referring to FIG. 1, FIG. 1 is a schematic architectural diagram of a universal integrated circuit card eUICC according to the present invention. The eUICC 1 includes: at least one secure element SE (one secure element 11 is used as an example in this embodiment), a processor 12, and a data interface 13.

Each secure element 11 of the at least one secure element is configured to store an application corresponding to at least one profile profile.

In this embodiment, the secure element 11 is configured to store an application corresponding to a profile profile in the eUICC. For example, in an eUICC remote provisioning specification defined by the GSMA, the SE may correspond to an ISD-P (Issuer Security Domain Profile). The profile is a collection of MNO-related file structures, data, and applications, mainly including a profile type, an ISD-P AID (ISD-P Application Identifier, which is used to identify an ISD-P), an ICCID (Integrated Circuit Card ID, which is used to uniquely identify a profile), an MSISDN, and the like, and may be configured in the ISD-P over the air, or may be configured in the ISD-P in another manner (for example, by means of wireless transmission). The management apparatus is a module that is in the eUICC and that is configured to execute some management commands such as ISD-P creation/deletion and profile enabling/disabling. Exemplarily, in the eUICC remote provisioning specification defined by the GSMA, the management apparatus may correspond to an ISD-R (Issuer Security Domain Root). The at least one public secure element SE (Secure Element) is space, in the eUICC and other than the storage module, that is used to store and run an application corresponding to a profile in the storage module.

The profile (Profile) refers to a combination of file structures, data, and applications. A file and/or an application (such as a network access application) of an enabled profile (Enabled Profile) may be selected by using a universal integrated circuit card-terminal (UICC-Terminal) interface.

There is a type of profile referred to as a provisioning profile (Provisioning profile). After the Provisioning profile is installed in an eUICC, the Provisioning profile may be used for access to a communications network, so as to provide a transmission capability for eUICC management and profile management between the eUICC and a remote entity (such as an SM-SR or an SM-DP). There is a type of profile referred to as an operational profile (operational profile). The Operational profile includes one or more network access applications and associated network access certificates.

The processor 12 is configured to manage at least one application stored in the at least one secure element.

The data interface 13 is configured to receive a profile enabling request. The profile enabling request is used to switch a source profile to a target profile, the profile enabling request includes identifier information of the target profile, and the source profile is a profile that is in an enabled state before the switching.

The processor 12 is further configured to update a first correspondence to a second correspondence according to the profile enabling request. The first correspondence is a correspondence between a first application set and the source profile, and the first application set includes at least one application in the at least one SE. The second correspondence is a correspondence between the second application set and the target profile, and the second application set includes at least one application in the first application set.

At least one application in the first application set refers to at least one of the at least one application, such as a wallet application developed by an operator, a payment application developed by a third party such as a bank, or a payment application jointly developed by a third party such as a bank and multiple operators, which is installed in the eUICC. The application in this embodiment also applies to the following embodiments, and is not described in detail below.

In this embodiment of the present invention, the processor can update a correspondence between at least one application (that is, a first application set) stored in the at least one SE and a source profile to a correspondence between at least one application (that is, a second application set) in the first application set and a target profile according to a profile enabling request, so as to ensure that some or all applications in the SE can still be used when subscription information of a bound MNO becomes invalid, thereby ensuring that after enabling the target profile, a user can normally access and use some or all applications and data in the SE that correspond to the source profile.

It should be noted that the first application set includes an application that corresponds to both the source profile and the target profile (that is, an application that can be normally used when the source profile or the target profile is enabled, that is, an application that can be normally used either in an MNO environment corresponding to the source profile or in an MNO environment corresponding to the target profile), and may further include all applications corresponding to only the source profile (that is, applications that can be normally used as long as the source profile is enabled, that is, applications that can be normally used only in the MNO environment corresponding to the source profile). The second application set includes at least one of the application that corresponds to both the source profile and the target profile, and may further include all applications corresponding to only the target profile (that is, applications that can be normally used as long as the target profile is enabled, that is, applications that can be normally used only in the MNO environment corresponding to the target profile).

To better described the solutions of the present invention, that the first application set includes an application that is in the at least one SE and that corresponds to both the source profile and the target profile is used as an example, and for specific content, refer to the following embodiments.

Optionally, in another embodiment, based on the foregoing embodiment, the first application set managed by the processor 12 includes: an application that is in the at least one SE and that corresponds to both the source profile and the target profile.

That is, the application that corresponds to both the source profile and the target profile refers to an application that can be used in both the MNO environments corresponding to the source profile and the target profile.

Optionally, in another embodiment, based on the foregoing embodiment, the at least one SE 11 is at least one public SE (not shown in the figure), and the at least one public SE is configured to store at least an application corresponding to the source profile and an application corresponding to the target profile.

Optionally, in another embodiment, based on the foregoing embodiment, the eUICC further includes: the memory, configured to: before the processor 12 updates the first correspondence to the second correspondence according to the profile enabling request, store the first correspondence, where the first correspondence includes a correspondence between an identifier of the first application set and identification information of the source profile.

Optionally, in another embodiment, based on the foregoing embodiment, the updating a first correspondence to a second correspondence according to the profile enabling request specifically includes:

selecting at least one application from the first application set according to the identification information of the target profile or according to the identification information of the target profile and a user indication; and obtaining an identifier of the selected at least one application from the first correspondence, and associating the identifier of the at least one application with the identification information of the target profile, to obtain the second correspondence.

The identification information of the target profile may be either of an ISD-P AID and an ICCID in the GSMA, or even a mobile phone number, an IMSI, or the like, but is not limited thereto.

Optionally, in another embodiment, based on the foregoing embodiment, the first correspondence specifically includes: a first mapping table of the eUICC and at least one profile. The first mapping table includes at least the identification information of the source profile; and a second mapping table of the at least one public SE, and the at least one application in the at least one public SE.

The processor 12 associates the first mapping table with the second mapping table, to obtain the first correspondence.

Optionally, in another embodiment, based on the foregoing embodiment, the first mapping table further includes: an identifier of the eUICC; or an identifier of the eUICC, enabled state information corresponding to the source profile, the identification information of the target profile, and disabled state information corresponding to the target profile.

The second mapping table further includes: the identifier of the eUICC, an identifier of the at least one public SE, and an identifier of the at least one application; or the identifier of the eUICC, an identifier of the at least one public SE, an identifier of the at least one application, and enabled or disabled state information of the at least one application.

The obtaining an identifier of the selected at least one application from the first correspondence, and associating the identifier of the at least one application with the identification information of the target profile, to obtain the second correspondence specifically includes: updating the identification information of the source profile in the first mapping table to the identification information of the target profile; or updating the enabled state information corresponding to the source profile in the first mapping table to disabled state information, and updating the disabled state information corresponding to the target profile to enabled state information;

updating the identifier of the at least one application in the second mapping table to an identifier of at least one of the at least one application; or setting, by the management apparatus, status information of the at least one application in the second mapping table to an enabled state, and setting status information corresponding to a remaining application to a disabled state; and associating, by the management apparatus, the first mapping table with the second mapping table, to obtain the second correspondence.

Optionally, in another embodiment, based on the foregoing embodiment, the at least one application in the first application set (that is, the at least one of the at least one application) includes: at least one application that is determined from the first application set according to a setting preset by a user; or at least one application that is determined from the first application set according to a selection made by a user during profile switching or after profile switching.

Optionally, in another embodiment, based on the foregoing embodiment, the data interface 13 is further configured to: when the at least one application in the first application set is at least one application that is determined by the processor from the first application set according to a selection made by a user during profile switching or after profile switching, output an application list to a terminal, where the application list includes the first application set stored in the public SE or at least one application in the first application set.

The processor 12 is further configured to determine at least one application from the application list according to a selection made by the user.

Further, in the foregoing embodiment, the processor in the eUICC can update a correspondence between at least one application stored in the at least one public SE and a source profile to a correspondence between the at least one application and a target profile according to a profile enabling request, so as to ensure that some or all applications in the public SE can still be used when subscription information of a bound MNO becomes invalid, thereby ensuring that after enabling the target profile, a user can normally access and use some or all applications and data in the public SE that correspond to the source profile.

Optionally, in another embodiment, based on the foregoing embodiment, the at least one SE 11 includes a first private SE and a second private SE (not shown in the figure), the first private SE is disposed in a first private storage device, and the second private SE is disposed in a corresponding second private storage device.

The processor is configured to manage the first private SE and the second private SE.

The source profile is installed in the first private SE, and the target profile is installed in the second private SE.

The first private SE is configured to store at least one application that corresponds to a profile installed in the first private storage device.

The second private SE is configured to store at least one application that corresponds to a profile installed in the second private storage device.

It should be noted that in this embodiment, the at least one SE 11 includes at least two private SEs, that is, the first private SE and the second private SE, which may be two private SEs in one SE; alternatively, the two SEs are two independent private SEs, that is, one SE is the first private SE, and the other SE is the second private SE.

Optionally, in another embodiment, based on the foregoing embodiment, the processor 12 is further configured to: determine information indicating that application and data migration needs to be performed, where the information is information used to migrate an application and data from the first private SE to the second private SE; and migrate at least one application in the first application set and data related to the at least one application to the second private SE according to the information, so as to update the first correspondence to the second correspondence. That is, at least one of the at least one application that is in the first private SE corresponding to the source profile and data related to the at least one application are migrated to the second private SE corresponding to the target profile, according to the information, so that the correspondence between the source profile and the at least one application that is stored in the first private SE and that corresponds to the source profile is updated to the correspondence between the at least one of the at least one application and the target profile.

In this embodiment, the processor 12 may determine, in multiple manners, the information indicating that application and data migration needs to be performed. In this embodiment, two manners are used as examples for description. One determining manner is shown in step 502 to step 510 in FIG. 5, and the other determining manner is shown in step 603 to step 609 in FIG. 6, which are not described in detail here. For details, refer to the following descriptions.

Optionally, in another embodiment, based on the foregoing embodiment, the migrating, according to the information, at least one application in the first application set and data related to the at least one application to the second private SE corresponding to the target profile specifically includes: obtaining the at least one application and the data related to the at least one application from the first application set according to the information; and migrating the obtained at least one application and the obtained data related to the at least one application to the second private SE corresponding to the target profile.

Optionally, in another embodiment, based on the foregoing embodiment, the obtaining the at least one application and the data related to the at least one application from the first application set includes:

the at least one application that is determined from the first application set according to the setting preset by the user, and data related to the at least one application; or the at least one application that is determined from the first application set according to the selection made by the user during the profile switching or after the profile switching, and data related to the at least one application.

Optionally, in another embodiment, based on the foregoing embodiment, the data interface 13 is further configured to: when the at least one application determined from the first application set is at least one application that is determined by the processor from the first application set according to a selection made by a user during profile switching or after profile switching, output a migratable-application list to a terminal, where the migratable-application list includes an identifier of an application that is stored in the first private SE corresponding to the source profile and that can be used when switching to the target profile is performed.

The processor 12 is further configured to determine, from the first application set according to a selection made by the user in the migratable-application list, at least one application in an application corresponding to the source profile.

Further, in this embodiment of the present invention, the processor in the eUICC can migrate, according to determined migration information, at least one application in a first private SE in a memory (for example, a source memory) corresponding to a source profile and data related to the at least one application to a second private SE in another memory (for example, a target memory) corresponding to a target profile, so that an application and data in the source memory can still be used when the source profile is disabled, thereby ensuring that after enabling the target profile, a user can normally access and use some or all applications and data in a public SE that correspond to the source profile.

Correspondingly, an embodiment of the present invention further provides a data update management apparatus, and a schematic structural diagram of the data update management apparatus is shown in FIG. 2. The management apparatus 21 is disposed in a universal integrated circuit card eUICC 2, at least one secure element SE 22 (where one SE is used as an example in this embodiment) is further disposed in the eUICC 2, the at least one SE 22 is configured to store an application corresponding to at least one profile profile, and the management apparatus 21 is configured to manage the at least one SE 22. The management apparatus 21 includes a first receiving unit 211 and an update unit 212.

The first receiving unit 211 is configured to receive a profile enabling request. The profile enabling request is used to switch a source profile to a target profile, the profile enabling request includes identifier information of the target profile, and the source profile is a profile that is in an enabled state before the switching.

The update unit 212 is configured to update a first correspondence to a second correspondence according to the profile enabling request. The first correspondence includes a correspondence between a first application set and the source profile, and the first application set includes at least one application in the at least one SE. The second correspondence is a correspondence between a second application set and the target profile, and the second application set includes at least one application in the first application set.

Optionally, the at least one application updated by the update unit 212 includes: an application that is in the at least one SE and that corresponds to both the source profile and the target profile.

Optionally, in another embodiment, based on the foregoing embodiment, the update unit 212 is specifically configured to: when the at least one secure element SE 22 is at least one public SE, and in this embodiment, the at least one public SE is configured to store at least an application corresponding to the source profile and an application corresponding to the target profile, update the first correspondence to the second correspondence according to the profile enabling request.

Optionally, in another embodiment, the apparatus further includes: a storage unit (not shown in the figure). The storage unit is configured to: before the update unit updates the first correspondence to the second correspondence according to the profile enabling request, store the first correspondence, where the first correspondence includes a correspondence between an identifier of the first application set and identification information of the source profile.

Optionally, in another embodiment, the update unit 212 includes: a selection unit and a first update unit (which are not shown in the figure). The selection unit is configured to select at least one application from the first application set according to the identification information of the target profile or according to the identification information of the target profile and a user indication. The first update unit is configured to obtain an identifier of the selected at least one application from the first correspondence, and associate the identifier of the at least one application with the identification information of the target profile, to obtain the second correspondence.

Optionally, in another embodiment, the storage unit includes: a first storage unit, a second storage unit, and an association unit. The first storage unit is configured to store a first mapping table of the eUICC and at least one profile. The first mapping table includes at least the identification information of the source profile. The second storage unit is configured to store a second mapping table of the eUICC, the at least one public SE, and the at least one application in the at least one public SE. The association unit is configured to associate the first mapping table with the second mapping table, to obtain the first correspondence.

Optionally, in another embodiment, the first mapping table stored in the first storage unit further includes: an identifier of the eUICC; or an identifier of the eUICC, enabled state information corresponding to the source profile, the identification information of the target profile, and disabled state information corresponding to the target profile. The second mapping table stored in the second storage unit further includes: the identifier of the eUICC, an identifier of the at least one public SE, and an identifier of the at least one application; or the identifier of the eUICC, an identifier of the at least one public SE, an identifier of the at least one application, and enabled or disabled state information of the at least one application.

The first update unit is specifically configured to: update the first mapping table according to the profile enabling request, where the identification information of the source profile in the first mapping table is updated to the identification information of the target profile; or the enabled state information corresponding to the source profile in the first mapping table is updated to disabled state information, and the disabled state information corresponding to the target profile is updated to enabled state information; update the second mapping table according to the profile enabling request, where the identifier of the at least one application in the second mapping table is updated to an identifier of at least one of the at least one application; or status information corresponding to at least one of the at least one application in the second mapping table is set to an enabled state, and status information corresponding to a remaining application is set to a disabled state; and associate the first mapping table with the second mapping table, to obtain the second correspondence.

Optionally, in another embodiment, the at least one application that is updated by the update unit 212 and that is in the first application set includes: at least one application that is determined from the first application set according to a setting preset by a user; or at least one application that is determined from the first application set according to a selection made by a user during profile switching or after profile switching.

Optionally, in another embodiment, the apparatus may further include: a first output unit and a first determining unit (which are not shown in the figure). The first output unit is configured to: when the at least one application that is updated by the update unit that is in the first application set is at least one application that is determined by the management apparatus from the first application set according to a selection made by a user during profile switching or after profile switching, output an application list to a terminal, where the application list includes the first application set stored in the public SE or at least one application in the first application set. The first determining unit is configured to determine at least one application from the application list according to a selection made by the user.

Optionally, in another embodiment, based on the embodiment shown in FIG. 2, the at least one secure element SE includes a first private SE and a second private SE, and at least a first storage module and a second storage module are further disposed in the eUICC. The management apparatus is further configured to manage at least the first storage module and the second storage module, the source profile is installed in the first storage module, and the target profile is installed in the second storage module. The first private SE is disposed in the first storage module, and the second private SE is disposed in the second storage module. The first private SE is configured to store at least one application corresponding to the source profile, and the second private SE is configured to store at least one application corresponding to the target profile.

That is, in this embodiment, the first storage module may be a source storage module, and the second storage module may be a target storage module. The at least one application may be an application corresponding to the source profile and the target profile. The application corresponding to the source profile and the target profile may be a same application, or may be multiple same applications, which is not limited in this embodiment.

Optionally, in another embodiment, the first application set is specifically the at least one application corresponding to the source profile in the first private SE. The update unit includes: a second determining unit and a migration unit (which are not shown in the figure). The second determining unit is configured to determine information indicating that application and data migration needs to be performed. The information is information used to migrate an application and data from the first private SE to the second private SE.

The migration unit is configured to migrate, according to the information, at least one application in the first application set and data related to the at least one application to the second private SE corresponding to the target profile, so that the first correspondence is updated to the second correspondence.

That is, at least one of the at least one application that is in the first private SE corresponding to the source profile and data related to the application are migrated to the second private SE corresponding to the target profile, according to the information, so that the correspondence between the source profile and the at least one application that is stored in the first private SE and that corresponds to the source profile is updated to the correspondence between the at least one of the at least one application and the target profile.

The data migration information may include at least the identification information of the target profile or identification information of the private SE corresponding to the target profile. The identification information of the target profile may be an identifier (such as an ICCID defined by the GSMA) of the target profile, or may be identifier information (such as an ISD-P AID defined by the GSMA) of the storage module corresponding to the target profile, or may be other information that can identify the target profile (such as a mobile phone number or an IMSI). The identification information of the private SE corresponding to the target profile may be an identifier (such as an SEID) of the private SE. Certainly, the migration information may further include other identification information, which is not limited in this embodiment.

Optionally, the migration unit includes an obtaining unit and a first migration unit. The obtaining unit is configured to obtain the at least one application and the data related to the at least one application from the first application set according to the information. The first migration unit is configured to migrate the obtained at least one application and the obtained data related to the at least one application to the second private SE.

Optionally, in another embodiment, the at least one application in the first application set and the data related to the at least one application that are obtained by the obtaining unit include: at least one application that is determined from the first application set according to a setting preset by a user, and data related to the at least one application; or at least one application that is determined from the first application set according to a selection made by a user during profile switching or after profile switching, and data related to the at least one application.

Optionally, in another embodiment, the apparatus may further include: a second output unit and a third determining unit (which are not shown in the figure). The second output unit is configured to: when the at least one application that is determined from the first application set and that is obtained by the obtaining unit is at least one application that is determined by the management apparatus from the first application set according to a selection made by a user during profile switching or after profile switching, output a migratable-application list to a terminal. The migratable-application list includes an identifier of an application that is stored in the first private SE and that can be used when switching to the target profile is performed.

The third determining unit is configured to determine at least one application from the first application set according to a selection made by the user in the migratable-application list.

In this embodiment of the present invention, the management apparatus can migrate, according to determined migration information, at least one application in a private SE in a source storage module corresponding to a source profile and data related to the at least one application to a private SE in a target storage module corresponding to a target profile, so that an application and data in the source storage module can still be used when the source profile is disabled, thereby ensuring that after enabling the target profile, a user can normally access and use some or all applications and data in a public SE that correspond to the source profile.

Based on the implementation process of the foregoing apparatus, an embodiment of the present invention further provides a data update method, and a flowchart of the data update method is shown in FIG. 3. The method is applied to a universal integrated circuit card eUICC in which a management apparatus and at least one secure element SE are disposed. The at least one SE is configured to store an application corresponding to at least one profile profile, and the management apparatus is configured to manage the at least one SE. The method includes:

Step 301: The management apparatus receives a profile enabling request, where the profile enabling request is used to switch a source profile to a target profile, the profile enabling request includes identifier information of the target profile, and the source profile is a profile that is in an enabled state before the switching.

Step 302: The management apparatus updates a first correspondence to a second correspondence according to the profile enabling request, where the first correspondence is a correspondence between a first application set and the source profile, and the first application set includes at least one application in the at least one SE; and the second correspondence is a correspondence between a second application set and the target profile, and the second application set includes at least one application in the first application set.

The first application set includes: an application that is in the at least one SE and that corresponds to both the source profile and the target profile. The application that corresponds to both the source profile and the target profile refers to an application that can be used in both MNO environments corresponding to the source profile and the target profile.

Optionally, the at least one secure element SE is at least one public SE.

The at least one public SE is configured to store at least an application corresponding to the source profile and an application corresponding to the target profile.

Optionally, in another embodiment, based on the foregoing embodiment, before the updating, by the management apparatus, a first correspondence to a second correspondence according to the profile enabling request, the method further includes:

storing, by the management apparatus, the first correspondence, where the first correspondence includes a correspondence between an identifier of the first application set and identification information of the source profile.

Optionally, in another embodiment, based on the foregoing embodiment, the updating, by the management apparatus, a first correspondence to a second correspondence according to the profile enabling request specifically includes:

selecting, by the management apparatus, at least one application from the first application set according to the identification information of the target profile or according to the identification information of the target profile and a user indication; and obtaining, by the management apparatus, an identifier of the selected at least one application from the first correspondence, and associating the identifier of the at least one application with the identification information of the target profile, to obtain the second correspondence.

Optionally, in another embodiment, based on the foregoing embodiment, the storing, by the management apparatus, the first correspondence includes:

storing, by the management apparatus, a first mapping table of the eUICC and at least one profile, where the first mapping table includes at least the identification information of the source profile;

storing, by the management apparatus, a second mapping table of the eUICC, the at least one public SE, and the at least one application in the at least one public SE; and associating, by the management apparatus, the first mapping table with the second mapping table, to obtain the first correspondence.

Optionally, in another embodiment, based on the foregoing embodiment, the first mapping table further includes: an identifier of the eUICC; or an identifier of the eUICC, enabled state information corresponding to the source profile, the identification information of the target profile, and disabled state information corresponding to the target profile.

The second mapping table further includes: the identifier of the eUICC, an identifier of the at least one public SE, and an identifier of the at least one application; or the identifier of the eUICC, an identifier of the at least one public SE, an identifier of the at least one application, and enabled or disabled state information of the at least one application.

The obtaining, by the management apparatus, an identifier of the selected at least one application from the first correspondence, and associating the identifier of the at least one application with the identification information of the corresponding target profile, to obtain the second correspondence includes:

updating, by the management apparatus, the identification information of the source profile in the first mapping table to the identification information of the target profile; or updating, by the management apparatus, the enabled state information corresponding to the source profile in the first mapping table to disabled state information, and updating the disabled state information corresponding to the target profile to enabled state information;

updating, by the management apparatus, the identifier of the at least one application in the second mapping table to an identifier of at least one of the at least one application; or setting, by the management apparatus, status information of the at least one application in the second mapping table to an enabled state, and setting status information corresponding to a remaining application to a disabled state; and associating, by the management apparatus, the first mapping table with the second mapping table, to obtain the second correspondence.

Optionally, the at least one application in the first application set includes: at least one application that is determined by the management apparatus from the first application set according to a setting preset by a user; or at least one application that is determined by the management apparatus from the first application set according to a selection made by a user during profile switching or after profile switching.

Optionally, in another embodiment, based on the foregoing embodiment, when the at least one application in the first application set is at least one application that is determined by the management apparatus from the first application set according to a selection made by a user during profile switching or after profile switching, the method further includes:

outputting, by the management apparatus, an application list to a terminal, where the application list includes the first application set stored in the public SE or at least one application in the first application set; and determining, by the management apparatus, at least one application from the application list according to a selection made by the user.

Optionally, in another embodiment, based on the foregoing embodiment, the at least one secure element SE includes a first private SE and a second private SE, the first private SE is disposed in a corresponding first storage module, and the second private SE is disposed in a corresponding second storage module.

The source profile is installed in the first storage module, and the target profile is installed in the second storage module.

The first private SE stores at least one application corresponding to the source profile, and the second private SE stores at least one application corresponding to the target profile.

The first storage module and the second storage module are disposed in the eUICC, and are managed by the management apparatus.

Optionally, in another embodiment, based on the foregoing embodiment, the first application set is specifically the at least one application corresponding to the source profile in the first private SE; and the updating, by the management apparatus, a first correspondence to a second correspondence according to the profile enabling request specifically includes:

determining, by the management apparatus, information indicating that application and data migration needs to be performed, where the information is information used to migrate an application and data from the first private SE to the second SE; and migrating, by the management apparatus, at least one application in the first application set and data related to the at least one application to the second private SE according to the information, so as to update the first correspondence to the second correspondence.

Optionally, in another embodiment, based on the foregoing embodiment, the migrating, by the management apparatus, at least one application in the first application set and data related to the application to the second private SE according to the information includes:

obtaining, by the management apparatus, the at least one application and the data related to the at least one application from the first application set according to the information; and migrating, by the management apparatus, the obtained at least one application and the obtained data related to the at least one application to the second private SE.

Optionally, in another embodiment, based on the foregoing embodiment, the at least one application in the first application set and the data related to the at least one application include:

at least one application that is determined by the management apparatus from the first application set according to a setting preset by a user, and data related to the application; or at least one application that is determined by the management apparatus from the first application set according to a selection made by a user during profile switching or after profile switching, and data related to the at least one application.

Optionally, in another embodiment, based on the foregoing embodiment, when the at least one application determined from the first application set is at least one application that is determined by the management apparatus from the first application set according to a selection made by a user during profile switching or after profile switching, the method further includes:

outputting, by the management apparatus, a migratable-application list to a terminal, where the migratable-application list includes an identifier of an application that is stored in the first private SE and that can be used when switching to the target profile is performed; and determining, by the management apparatus, at least one application from the first application set according to a selection made by the user in the migratable-application list.

To facilitate understanding of a person skilled in the art, the following provides a description by using specific application examples.

Further, refer to FIG. 4. FIG. 4 is a flowchart of a first application example of a data update method according to an embodiment of the present invention. This embodiment is described based on an eUICC remote provisioning specification formulated by the GSMA. In this embodiment, a process of updating a profile associated with an application in a public SE is described by using a specific application example. In the process, an eUICC includes a management apparatus. The management apparatus includes, for example, a maintenance and update module and a switching module, but is not limited thereto. An update process thereof specifically includes:

Step 401: The eUICC maintains an SEID-EID mapping list and an EID-ICCID mapping list by using an application selection and query module.

An SEID is used to identify a secure element SE, an EID is used to identify an embedded universal integrated circuit card eUICC, and an ICCID is used to identify a profile.

In an example, it is assumed that the eUICC includes multiple public SEs, where n applications are already installed in an $SE_1$ (which has an identifier of $SEID_1$), $AID_1$ to $AID_k$ are applications corresponding to a profile 1, and $AID_1$ and $AID_k$ can still be used after the profile 1 is switched to a profile 2 (that is, $AID_1$ and $AID_k$ are applications that are jointly subscribed to by an MNO corresponding to the profile 1 and an MNO corresponding to the profile 2, that is, both the two applications can be used in the two MNO environments. An SEID-EID list is shown in Table 1:

TABLE 1

| EID | $SEID_1$ | $AID_1$ |
|-----|----------|---------|
|     |          | $AID_2$ |
|     |          | ...     |
|     |          | $AID_k$ |
|     |          | ...     |
|     |          | $AID_n$ |
|     | ...      |         |
|     | $SEID_m$ |         |

Assuming that currently the profile 1 in the eUICC is enabled (enabled), and remaining profile 2 to profile m are all disabled (disabled), an EID-ICCID list is shown in Table 2:

TABLE 2

| EID | $ICCID_1$ (enabled) |
|-----|---------------------|
|     | $ICCID_2$ (disabled) |
|     | ...                 |
|     | $ICCID_m$ (disabled) |

Table 2 is described by using an example in which a profile is identified by an ICCID. Certainly, other identifiers such as an ISD-P AID, a mobile phone number, and an IMSI may also be used. In this example, the EID-ICCID list described in Table 2 includes an identifier (such as an EID) of the eUICC, an identifier (such as $ICCID_1$) of the profile 1, status information (such as an enabled state enabled) corresponding to the profile 1, an identifier (such as $ICCID_2$) of the profile 2, status information (such as a disabled state disabled) corresponding to the profile 2, and the like. After profile switching is completed, only corresponding status information of the profiles in the list needs to be updated. In addition, the EID-ICCID list may alternatively include only the identifier (such as the EID) of the eUICC and the identifier (such as $ICCID_1$) of the profile 1. After profile switching is completed, only the identifiers of the profiles in the list need to be updated.

Step 402: An MNO sends a profile enabling request (Profile Enabling Request) to an SM-SR, where the request includes an EID and a target ICCID.

It should be noted that the sending, by an MNO, a profile enabling request to an SM-SR may be that a user proactively requests the MNO to trigger, or may be automatically triggered by the MNO, which is not limited in the present invention.

Step 403: After completing a policy check (and mutual authentication with the eUICC), an SM-SR forwards the profile enabling request (Profile enabling request) to the switching module in the eUICC, where the profile enabling request includes an ISD-P AID corresponding to a target profile.

It should be noted that according to the eUICC remote provisioning specification formulated by the GSMA, an eUICC information set (eUICC Information Set, EIS) stored by the SM-SR includes related identification information of each profile (as shown in the following EIS content); therefore, the SM-SR may find, according to the target ICCID in step 803, the ISD-P AID corresponding to the target profile.

The EIS content is as follows:

---

EIS={EID,
   Type, Version, Production Date,
   Platform Management Credentials, Certificate,
   SRID,
   {profile 0: profile Type, ISD-P AID, ICCID, MSISDN, State, DPID,
   Allocated Memory, POL2
     profile 1: profile Type, ISD-P AID, ICCID, MSISDN, State, DPID,
     Allocated Memory, POL2
     ...
     profile n: . . .
   }
}

---

ISD-P AID: ISD-P Application Identifier, which is used to identify an ISD-P.

ICCID: Integrated Circuit Card ID, which is generated by the SM-DP in a personalization process of a profile, and may be used to identify the profile.

MSISDN: Mobile Subscriber International ISDN (Integrated Service Digital Network, integrated services digital network) number, which may be understood as a unique number that can identify a mobile user in a telephony network, and therefore, may also be used to identify a profile.

DPID: ID of the relevant SM-DP, which is used to identify the SM-DP.

SRID: ID of the relevant SM-SR, which is used to identify the SM-SR.

Step 404: The switching module of the eUICC performs a profile switching operation after a policy check is performed, that is, disables a source profile and enables the target profile.

Step 405: The switching module of the eUICC sends a list update and maintenance request to the maintenance and update module, where the list update and maintenance request includes the target ICCID.

Step 406: The maintenance and update module of the eUICC maintains the SEID-EID list and updates the EID-ICCID list, to bind AIDs of some or all applications of the source profile to the target profile.

Specifically, the maintenance and update module maintains the SEID-EID list. The list may be maintained according to an AID(s) of a to-be-bound application(s) that is/are set in advance (that is, some or all applications corresponding to the source profile), or the list may be maintained according to an AID(s) of a to-be-bound application(s) that is/are determined according to a selection made by the user in real time. It should be noted that the above-mentioned actions of maintaining the SEID-EID list are not specifically shown in FIG. 8.

Exemplarily, assuming that the target profile is the profile 2, the EID-ICCID list is updated to:

TABLE 3

| EID | $ICCID_1$ (disabled) |
|---|---|
|  | $ICCID_2$ (enabled) |
|  | ... |
|  | $ICCID_m$ (disabled) |

Specifically, in this example, according to content of the foregoing Table 2, the status information corresponding to the source profile ($ICCID_1$) in the EID-ICCID list needs to be updated from enabled (enabled) to disabled (disabled), and the status information corresponding to the target profile ($ICCID_2$) needs to be updated from disabled (disabled) to enabled (enabled). In addition, if the EID-ICCID list includes only the identifier (such as the EID) of the eUICC and the identifier (such as $ICCID_1$) of the profile 1, the identifier of the profile needs to be updated from the source profile ($ICCID_1$) to the target profile ($ICCID_2$).

It should be noted that some or all AIDs of the source profile can be bound to the target profile only after the EID-ICCID list is updated and the applications to be bound are determined. Determining, from all the AIDs corresponding to the source profile, some or all AIDs that are to be bound to the target profile may specifically include the following cases:

(1) The AID(s) that is/are to be bound to the target profile may be set before the profile switching is requested, that is, set in advance, that is, set before step 802. It should be noted that the setting action may be implemented when an application is downloaded and installed, or the AID(s) may be uniformly set by the user after all applications are installed.

(2) An application (such as $AID_1$ and $AID_k$ in Table 1) that can be bound to the target profile 2 may be reported to the user by using a UI of a terminal before the EID-ICCID list is updated, for example, after the eUICC receives the profile enabling request or after profile enabling is completed, and then the application to be bound is determined according to a selection made by the user.

(3) After the EID-ICCID list is updated, similar to the method (2), an application that can be bound may be reported to the user and the user is prompted to make a selection to determine the application to be bound.

Step 407: The maintenance and update module of the eUICC feeds back an EID-ICCID list update notification and an application binding update result to a user by using a UI.

By means of the foregoing step 401 to step 407, subscription data of all applications that are bound to the target profile and that correspond to the source profile may be quickly updated by using the SEID-EID list and the EID-ICCID list, so as to ensure that after enabling the target profile, the user can normally access and use some or all applications and data in a public SE that correspond to the source profile.

Step 408: The user sends an application selection request to the eUICC by using the UI of a terminal, where the application selection request includes an AID(s) of an application(s) and an SEID of the eUICC in which the application(s) is located.

Step 409: The eUICC queries, based on the EID-ICCID list and the SEID-EID list maintained by the maintenance and update module, for an ICCID(s) currently corresponding to the AID(s).

Step 410: The eUICC feeds back a query notification to the user by using the UI, where the query notification may include the AID(s) and the ICCID(s).

It should be noted that in the foregoing implementation process, step 408 to step 410 are optional steps.

Step 402 to step 404 are a profile update phase; step 405 and step 407 are a list update phase; and step 408 to step 410 are an application selection and query phase.

It should be noted that still using that the source profile is the profile 1 and the target profile is the profile 2 as an example, when the profile 1 is in an enabled state, the SEID-EID list shown in the foregoing Table 1 may include only the applications that correspond to both the profile 1 and the profile 2, that is, may include only $AID_1$ and $AID_k$ that can be normally used both in an MNO environment corresponding to the profile 1 and an MNO environment corresponding to the profile 2. The SEID-EID list may alternatively include the applications that correspond to both the profile 1 and the profile 2, and the applications $AID_2$ to $AID_{k-1}$ that correspond to only the profile 1. After the profile 1 is disabled, and the profile 2 is enabled, correspondingly, the SEID-EID list shown in the foregoing Table 1 may include only some or all applications such as $AID_1$ and/or $AID_k$ that are selected from applications corresponding to functions of the profile 1 and the profile 2, and certainly, may further include an AID of an application that corresponds to only the profile 2.

Figure 5:
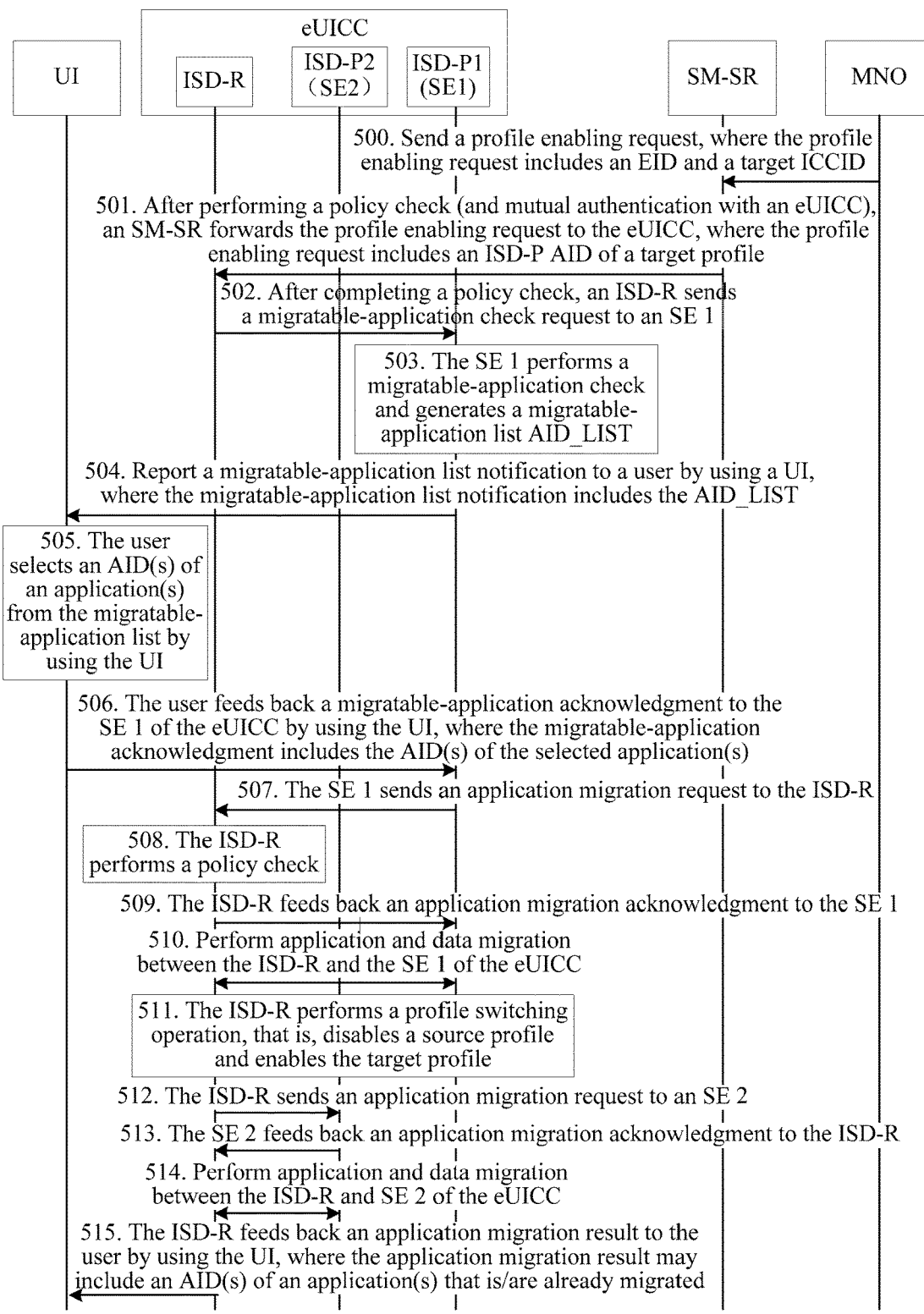
FIG. 5 is a flowchart of a second application example of a data update method according to an embodiment of the present invention.

Referring to FIG. 5, FIG. 5 is a flowchart of a second application example of a data update method according to an embodiment of the present invention. This embodiment is an extension based on an eUICC remote provisioning specification of the GSMA. In this embodiment, a process of migrating and updating an application and data that are in a private SE is described by using a specific application example. An eUICC includes, for example, an ISD-R (that is, a management apparatus), an ISD-P2 (including an SE 2) (that is, a second storage module or a target storage module), and an ISD-P1 (including an SE 1) (that is, a first storage module or a source storage module), but is not limited thereto. A migration and update process thereof specifically includes:

In this example, it is assumed that a source profile is a profile 1 and corresponds to a private secure element SE 1; a target profile is a profile 2 and corresponds to a private secure element SE 2; and $AID_1$ to $AID_m$ are corresponding identifiers of m applications installed in the SE 1, where two applications corresponding to $AID_1$ and $AID_k$ can still be normally used when the profile 1 is switched to the profile 2 (that is, it may be understood as that the two applications are applications that are jointly subscribed to by two MNOs corresponding to the profile 1 and the profile 2, and the two applications can be used in both of the two MNO environments).

Step 500: An MNO sends a profile enabling request (Profile Enabling Request) to an SM-SR, where the profile enabling request includes an EID and a target ICCID.

Step 501: After performing a policy check (and mutual authentication with the eUICC), an SM-SR forwards the profile enabling request to the ISD-R of the eUICC, where the profile enabling request includes an ISD-P AID corresponding to a target profile.

It should be noted that the policy check herein is a policy check performed by an SM-SR in the eUICC remote provisioning protocol formulated by the GSMA, and is not described in detail herein. In addition, if the SM-SR and the eUICC have not performed mutual authentication, the mutual authentication needs to be performed, as indicated by the content in the parentheses in this step.

Step 502: After performing a policy check, the ISD-R sends a migratable-application check request to the SE 1.

It should be noted that the policy check herein is a policy check performed by an eUICC in the eUICC remote provisioning protocol formulated by the GSMA, and is not described in detail herein. In addition, in this embodiment, the following step 503 may not necessarily be triggered by the migratable-application check request in step 502, but instead, the following step 503 may be triggered by an operation of disabling the profile 1 in the ISD-P1 by the ISD-R after the eUICC completes the policy check.

Step 503: The SE 1 performs a migratable-application check according to the received migratable-application check request and generates a migratable-application list AID_LIST. It should be noted that in this embodiment, based on the foregoing assumption in the embodiment shown in FIG. 4, applications included in the migratable-application list AID_LIST are $AID_1$ and $AID_k$.

Step 504: The SE 1 of the eUICC reports a migratable-application list notification to a user by using a UI, where the migratable-application list includes the migratable-application list AID_LIST.

It should be noted that in this embodiment, the SE 1 may directly report the migratable-application list to the user, or may report the migratable-application list to the user by using the ISD-R.

Step 505: The user selects an AID(s) of an application(s) from the migratable-application list by using the UI.

Step 506: The user feeds back a migratable-application acknowledgment to the SE 1 of the eUICC by using the UI, where the migratable-application acknowledgment includes the AID(s) of the selected application(s).

Specifically, in this embodiment, a UI of a terminal may directly feed back a user selection result to the SE 1, or may feed back a user selection result to the SE 1 by using the ISD-R.

It should be noted that step 504 to step 506 are optional steps. That is, in this embodiment, the SE 1 of the eUICC may not report the user selection result to the user, but instead, the ISD-R makes a selection by itself and determines an AID(s) of an application(s) to be migrated, or determines, according to a migratable application selected by the user in advance, an AID(s) of an application(s) to be migrated.

Step 507: The SE 1 of the eUICC sends an application migration request to the ISD-R.

It should be noted that the application migration request may include an identifier SEID1 of a source SE and/or an identifier SEID2 of a target SE, or may not include an SEID1, or may not include the SEID2, because the profile enabling request previously received by the ISD-R includes the ISD-P AID corresponding to the target profile. In addition, in the foregoing step 506, if the ISD-R does not know a migratable-application(s) to be migrated, the request in this step may carry an AID(s) of the application(s).

Step 508: The ISD-R of the eUICC performs a policy check.

It should be noted that the policy check described herein is different from the 39 policy checks described in the foregoing step 501 and step 502. The policy check performed by the ISD-R is mainly for purpose of checking whether the eUICC supports migrating, by using the ISD-R, these subscription applications and data related to the subscription applications from a private SE corresponding to a profile of an MNO to a private SE corresponding to a profile of another MNO that has a cooperation and subscription relationship with the MNO in applications. The applications described herein may be applications that can support online and/or offline payment, such as a bank card application and a public transportation card application. Correspondingly, data related to these applications may be: data generated in a patronization phase of a card, such as a card number or a card key, transaction-related data that is generated during use of a card, and the like. A specific policy check manner is not limited in the present invention.

Step 509: After performing a policy check, the ISD-R of the eUICC feeds back an application migration acknowledgment to the SE 1.

Specifically, based on the foregoing step 508, if a result of the policy check is yes, the ISD-R feeds back an application migration acknowledgment to the SE 1, to notify the SE 1 that the application and the data related to the application that are determined above (such as in step 504 to step 506) can be migrated to the ISD-R.

Step 510: Perform application and data migration between the ISD-R and the SE 1 of the eUICC.

Specifically, the SE 1 migrates the application and the data related to the application that are determined in the foregoing step 504 to step 506 to the ISD-R.

It should be noted that in this embodiment, step 503 to step 506 or step 504 to step 506 may alternatively be performed between step 509 and step 510.

Step 511: The ISD-R of the eUICC performs a profile switching operation, that is, disables the source profile and enables the target profile.

It should be noted that this step may alternatively be performed before step 510 or after step 512.

Step 512: The ISD-R of the eUICC sends an application migration request to the SE 2.

Step 513: The SE 2 of the eUICC feeds back an application migration acknowledgment to the ISD-R.

Step 514: Perform application and data migration between the ISD-R and the SE 2 of the eUICC.

Specifically, the ISD-R migrates the selected application and the data related to the selected application that are obtained from the SE 1 based on the foregoing step 510 to the SE 2. In addition, this step may alternatively be completed during the foregoing step 512 and step 513. That is, the application migration request sent by the ISD-R to the SE 2 includes the application and the data related to the application that are migrated in this step.

Step 515: The ISD-R of the eUICC feeds back an application migration result notification to the user by using the UI, where the application migration result notification may include an AID(s) of an application(s) that is/are already migrated.

Certainly, in this embodiment, the ISD-R included in the eUICC may be understood as a function module in the management apparatus, the ISD-P2 (SE 2) may be understood as a function module in the target storage module, and the ISD-P1 (SE 1) may be understood as a function module in the source storage module.

It should be noted that in this embodiment, for definitions of the SM-DP, the ISD-R, the SM-SR, the ISD-P, and some related identifiers, refer to parameter definitions made by the GSM Association (GSMA), and are not described in detail herein. The ISD-R and the ISD-P may be understood as logical entities rather than physical entities.

Figure 6:
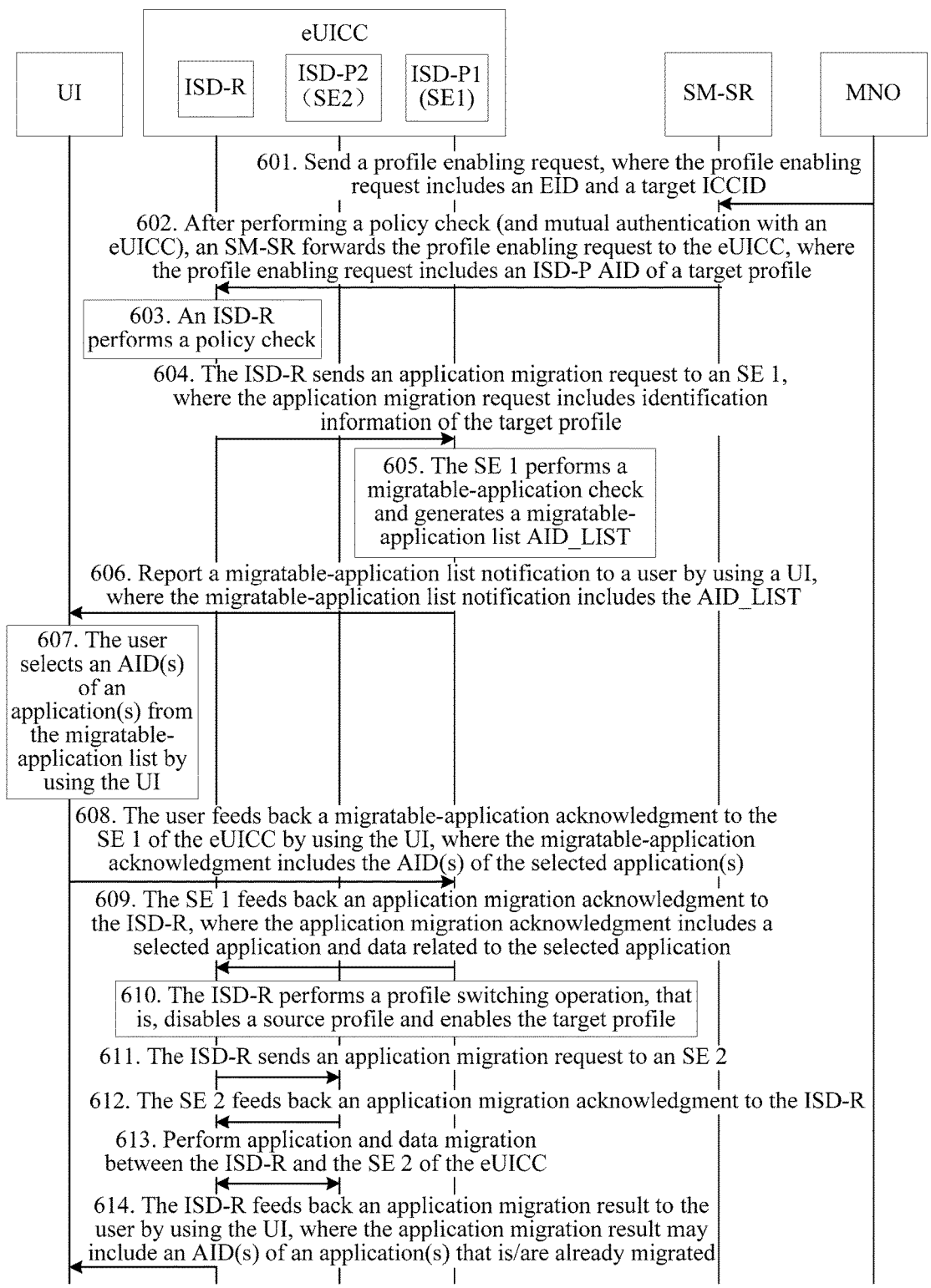
FIG. 6 is a flowchart of a third application example of a data update method according to an embodiment of the present invention.

In this embodiment, in addition to the foregoing implementation manner shown in FIG. 5, an objective of migrating an application and data related to the application from a private SE corresponding to a source profile to a private SE corresponding to a target profile may also be implemented by using other implementation manners. The other specific implementation manners include, for example, but not limited to, the following two embodiments:

In a first embodiment, after step 502 in FIG. 5, the ISD-R may send (after performing the policy check described in step 508) an application migration request to the ISD-P1 (as described in the foregoing step 507). The ISD-P1 performs (after performing a policy check similar to the policy check described in step 508) a migratable-application check according to the request (as described in the foregoing step 503), and reports, to the ISD-R, a migratable-application list AID_LIST obtained after the check. The ISD-R determines, by itself, a selected application according to the AID_LIST or requests a user to determine a selected application, and feeds back an application migration acknowledgment to the ISD-P1 (as described in the foregoing step 509). The ISD-P1 sends a corresponding application on the private SE (the SE 1) of the ISD-P1 and data related to the application to the ISD-R according to the selected application (as described in the foregoing step 510). For details, refer to a third application example shown in FIG. 6:

In FIG. 6, for details of step 601 and step 602, refer to step 500 and step 501.

Step 603: The ISD-R performs a migratable-application check.

Step 604: The ISD-R sends an application migration request to an SE 1, where the application migration request includes identification information of the target profile.

For details of step 605 to step 608, refer to step 503 to step 506.

Step 609: The SE 1 feeds back an application migration acknowledgment to the ISD-R, where the application migration acknowledgment includes a selected application and data related to the selected application.

For details of step 610 to step 614, refer to step 511 to step 515.

In a second embodiment, after step 502 in FIG. 5, the ISD-R may send (after performing the policy check described in step 508) a migratable-application check request to the ISD-P1. The ISD-P1 performs (after performing a policy check similar to the policy check described in step 508) a migratable-application check according to the request (as described in the foregoing step 503), and reports, to the ISD-R, a migratable-application list AID_LIST obtained after the check. The ISD-R determines, by itself, a selected application according to the AID_LIST or requests a user to determine a selected application, and feeds back the selected application to the ISD-P 1. The ISD-P1 may directly send a corresponding application on the private SE (the SE 1) of the ISD-P1 and data related to the application to the ISD-R (as described in the foregoing step 510), or send the application and the data related to the application to the ISD-R after sending an application migration request to the ISD-R and receiving an acknowledgment from the ISD-R (as described in step 507 and step 509).

In can be known from the foregoing embodiments that in a case in which multiple private SEs are disposed in the eUICC to separately store an application and data that correspond to each profile, by means of the embodiments of the present invention, a management apparatus in the eUICC determines information indicating that application and data migration needs to be performed, and migrates, according to the migration information, at least one application in a private SE in a source storage module corresponding to a source profile and data related to the at least one application to a private SE in a target storage module corresponding to a target profile, so that an application and data in the source storage module can still be used after the source profile is disabled, thereby ensuring that after enabling the target profile, a user can normally access and use some or all applications and data that correspond to the source profile.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A data update method, wherein the method is applied to an embedded universal integrated circuit card eUICC in which a management apparatus and at least one secure element SE are disposed, wherein the at least one SE is configured to store an application corresponding to at least one profile, and the management apparatus is configured to manage the at least one SE; and the method comprises:
   receiving, by the management apparatus, a profile enabling request, wherein the profile enabling request is used to switch a source profile to a target profile, the profile enabling request comprises identifier information of the target profile, and the source profile is a profile that is in an enabled state before the switching; and
   updating, by the management apparatus, a first correspondence to a second correspondence according to the profile enabling request, wherein
   the first correspondence is a correspondence between a first application set and the source profile, and the first application set comprises at least one application in the at least one SE; and the second correspondence is a correspondence between a second application set and the target profile, and the second application set comprises at least one application in the first application set.

2. The method according to claim 1, wherein
   the first application set comprises: an application that is in the at least one SE and that corresponds to both the source profile and the target profile.

3. The method according to claim 1, wherein the at least one secure element SE is at least one public SE; and
   the at least one public SE is configured to store at least an application corresponding to the source profile and an application corresponding to the target profile.

4. The method according to claim 3, wherein before the updating, by the management apparatus, a first correspondence to a second correspondence according to the profile enabling request, the method further comprises:
   storing, by the management apparatus, the first correspondence, wherein the first correspondence comprises a correspondence between an identifier of the first application set and identification information of the source profile.

5. The method according to claim 3, wherein the updating, by the management apparatus, a first correspondence to a second correspondence according to the profile enabling request specifically comprises:
   selecting, by the management apparatus, at least one application from the first application set according to the identification information of the target profile or according to the identification information of the target profile and a user indication; and
   obtaining, by the management apparatus, an identifier of the selected at least one application from the first correspondence, and associating the identifier of the at least one application with the identification information of the target profile, to obtain the second correspondence.

6. The method according to claim 4, wherein the storing, by the management apparatus, the first correspondence comprises:
   storing, by the management apparatus, a first mapping table of the eUICC and at least one profile, wherein the first mapping table comprises at least the identification information of the source profile;
   storing, by the management apparatus, a second mapping table of the eUICC, the at least one public SE, and the at least one application in the at least one public SE; and
   associating, by the management apparatus, the first mapping table with the second mapping table, to obtain the first correspondence.

7. The method according to claim 5, wherein
   the first mapping table further comprises: an identifier of the eUICC; or an identifier of the eUICC, enabled state information corresponding to the source profile, the identification information of the target profile, and disabled state information corresponding to the target profile;
   the second mapping table further comprises: the identifier of the eUICC, an identifier of the at least one public SE, and an identifier of the at least one application; or the identifier of the eUICC, an identifier of the at least one public SE, an identifier of the at least one application, and enabled or disabled state information of the at least one application; and
   the obtaining, by the management apparatus, an identifier of the selected at least one application from the first correspondence, and associating the identifier of the at least one application with the identification information of the target profile, to obtain the second correspondence comprises:
   updating, by the management apparatus, the identification information of the source profile in the first mapping table to the identification information of the target profile; or updating, by the management apparatus, the enabled state information corresponding to the source profile in the first mapping table to disabled state information, and updating the disabled state information corresponding to the target profile to enabled state information;
   updating, by the management apparatus, the identifier of the at least one application in the second mapping table to an identifier of at least one of the at least one application; or setting, by the management apparatus, status information of the at least one of the at least one application in the second mapping table to an enabled state, and setting status information corresponding to a remaining application to a disabled state; and associating, by the management apparatus, the first mapping table with the second mapping table, to obtain the second correspondence.

8. The method according to claim 1, wherein
the at least one application in the first application set comprises: at least one application that is determined by the management apparatus from the first application set according to a setting preset by a user; or at least one application that is determined by the management apparatus from the first application set according to a selection made by a user during profile switching or after profile switching.

9. The method according to claim 8, wherein when the at least one application in the first application set is at least one application that is determined by the management apparatus from the first application set according to a selection made by a user during profile switching or after profile switching, the method further comprises:
outputting, by the management apparatus, an application list to a terminal, wherein the application list comprises the first application set stored in the public SE or at least one application in the first application set; and
determining, by the management apparatus, at least one application from the application list according to a selection made by the user.

10. The method according to claim 1, wherein
the at least one secure element SE comprises a first private SE and a second private SE, the first private SE is disposed in a corresponding first storage module, and the second private SE is disposed in a corresponding second storage module;
the source profile is installed in the first storage module, and the target profile is installed in the second storage module;
the first private SE stores at least one application corresponding to the source profile, and the second private SE stores at least one application corresponding to the target profile; and
the first storage module and the second storage module are disposed in the eUICC, and are managed by the management apparatus.

11. An embedded universal integrated circuit card eUICC, comprising:
at least one secure element SE, wherein each SE is configured to store an application corresponding to at least one profile;
a processor, configured to manage at least one application stored in the at least one SE; and
a data interface, configured to receive a profile enabling request, wherein the profile enabling request is used to switch a source profile to a target profile, the profile enabling request comprises identifier information of the target profile, and the source profile is a profile that is in an enabled state before the switching, wherein
the processor is further configured to update a first correspondence to a second correspondence according to the profile enabling request, wherein the first correspondence comprises a correspondence between a first application set and the source profile, and the first application set comprises at least one application in the at least one SE; and a second correspondence is a correspondence between the second application set and the target profile, and the second application set comprises at least one application in the first application set.

12. The eUICC according to claim 11, wherein
the first application set managed by the processor comprises: an application that is in the at least one SE and that corresponds to both the source profile and the target profile.

13. The eUICC according to claim 11, wherein
the at least one SE is at least one public SE, and the at least one public SE is configured to store at least an application corresponding to the source profile and an application corresponding to the target profile.

14. The eUICC according to claim 13, further comprising:
a memory, configured store the first correspondence, wherein the first correspondence comprises a correspondence between an identifier of the first application set and identification information of the source profile.

15. The eUICC according to claim 13, wherein
the updating a first correspondence to a second correspondence according to the profile enabling request specifically comprises:
selecting at least one application from the first application set according to the identification information of the target profile or according to the identification information of the target profile and a user indication; and
obtaining an identifier of the selected at least one application from the first correspondence, and associating the identifier of the at least one application with the identification information of the target profile, to obtain the second correspondence.

16. The eUICC according to claim 14, wherein
the first correspondence specifically comprises: a first mapping table of the eUICC and at least one profile, wherein the first mapping table comprises at least the identification information of the source profile; and a second mapping table of the eUICC, the at least one public SE, and the at least one application in the at least one public SE; and
the first mapping table is associated with the second mapping table, to obtain the first correspondence.

17. The eUICC according to claim 16, wherein
the first mapping table further comprises: an identifier of the eUICC; or an identifier of the eUICC, enabled state information corresponding to the source profile, the identification information of the target profile, and disabled state information corresponding to the target profile;
the second mapping table further comprises: the identifier of the eUICC, an identifier of the at least one public SE, and an identifier of the at least one application; or the identifier of the eUICC, an identifier of the at least one public SE, an identifier of the at least one application, and enabled or disabled state information of the at least one application; and
the obtaining an identifier of the selected at least one application from the first correspondence, and associating the identifier of the at least one application with the identification information of the target profile, to obtain the second correspondence specifically comprises:
updating the identification information of the source profile in the first mapping table to the identification information of the target profile; or updating the enabled state information corresponding to the source profile in the first mapping table to disabled state information, and updating the disabled state information corresponding to the target profile to enabled state information;

updating the identifier of the at least one application in the second mapping table to an identifier of at least one of the at least one application; or setting status information of the at least one application in the second mapping table to an enabled state, and setting status information corresponding to a remaining application to a disabled state; and associating the first mapping table with the second mapping table, to obtain the second correspondence.

18. The eUICC according to claim 11, wherein the at least one application in the first application set comprises:
at least one application that is determined from the first application set according to a setting preset by a user; or at least one application that is determined from the first application set according to a selection made by a user during profile switching or after profile switching.

19. The eUICC according to claim 18, wherein
the data interface is further configured to: when the at least one application in the first application set is at least one application that is determined by the processor from the first application set according to a selection made by a user during profile switching or after profile switching, output an application list to a terminal, wherein the application list comprises the first application set stored in the public SE or at least one application in the first application set; and the processor is further configured to determine at least one application from the application list according to a selection made by the user.

20. The eUICC according to claim 19, wherein the at least one SE comprises a first private SE and a second private SE, the first private SE is disposed in a first private storage device, and the second private SE is disposed in a second private storage device;

the processor is configured to manage the first private SE and the second private SE;

the source profile is installed in the first private SE, and the target profile is installed in the second private SE;

the first private SE is configured to store at least one application that corresponds to a profile installed in the first private storage device; and the second private SE is configured to store at least one application that corresponds to a profile installed in the second private storage device.

\* \* \* \* \*